United States Patent

[11] 3,586,016

[72] Inventor David O. Meyn
 Detroit, Mich.
[21] Appl. No. 5,082
[22] Filed Jan. 22, 1970
[45] Patented June 22, 1971
[73] Assignee Ford Motor Company
 Dearborn, Mich.

[54] FUEL TANK LIQUID VAPOR SEPARATOR SYSTEM HAVING ATTITUDE SENSING MEANS
 5 Claims, 6 Drawing Figs.
[52] U.S. Cl. .................................................. 137/39,
 137/43, 137/412, 220/85 VS
[51] Int. Cl. ...................................................... F16k 31/02
[50] Field of Search .................................................. 137/39, 43;
 220/44 R, 85 S, 85 V, 85 VR, 85 VS

[56] References Cited
UNITED STATES PATENTS
3,242,937  3/1966  Morin........................... 137/39

Primary Examiner—Robert G. Nilson
Attorneys—John R. Faulkner and Glenn S. Arendsen ABSTRACT: Electrical switches actuated by a liquid fuel sensing device and by a pressure device are connected in series with each other and with a solenoid valve controlling fluid flow through a conduit connected to the upper interior of the fuel tank. The solenoid valve opens only when tank pressure exceeds a predetermined minimum and the conduit opening is free of liquid fuel. A fuel tank attitude sensing mechanism prevents the valve from opening whenever tank attitude varies from normal tank attitude by some predetermined amount.

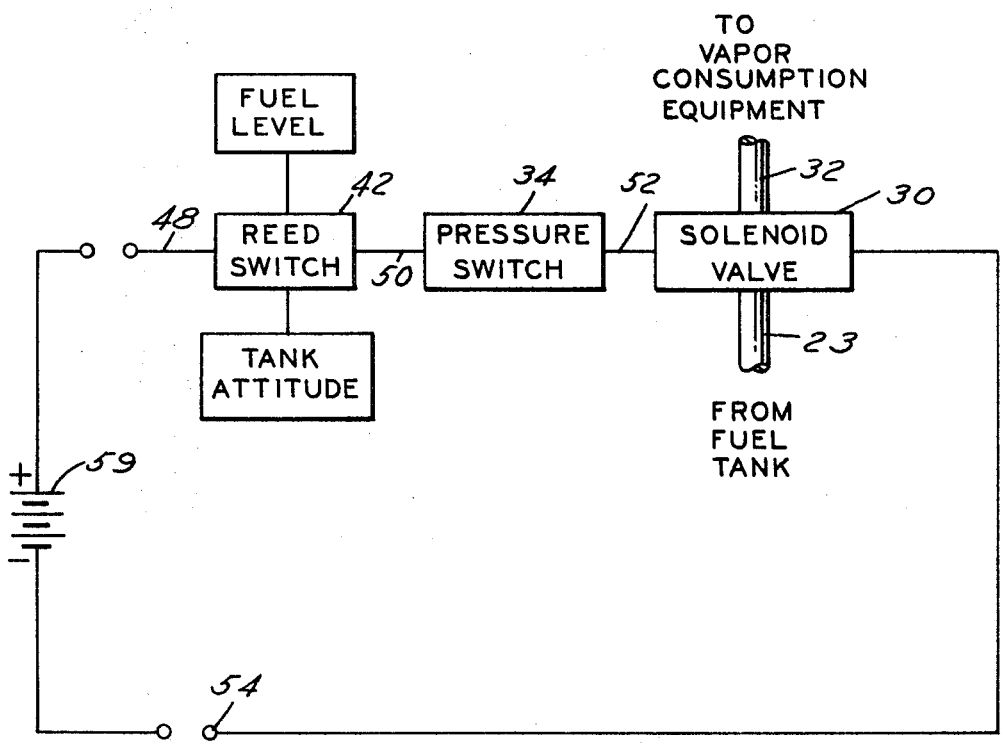

INVENTOR.
DAVID O. MEYN
BY John R. Faulkner
Glenn S. Arendsen
ATTORNEYS 3,586,016

FUEL TANK LIQUID VAPOR SEPARATOR SYSTEM HAVING ATTITUDE SENSING MEANS

SUMMARY OF THE INVENTION

Evaporation losses from vehicle fuel tanks contribute in some undetermined degree to the contamination of the atmosphere. Various systems have been proposed for burning in the vehicle engine fuel vapors formed above the liquid fuel in the fuel tank. Many of these systems use an absorbent to contain those fuel vapors formed while the vehicle engine is not operating.

The presence of even very small amounts of liquid fuel in these vapor systems interferes significantly with the vapor storage system and with the engine combustion process. A vapor separator system capable of preventing liquid fuel from reaching the storage system thus is an essential part of any such vapor separator system.

This invention provides a system for removing fuel vapors from a vehicle fuel tank that does not transmit liquid fuel regardless of tank attitude including an inverted attitude. Preventing liquid fuel transmission during an inverted tank attitude is necessary to reduce the fire hazard associated with a vehicle accident. The system comprises a source of electrical energy, which typically is the vehicle battery, and a conduit opening into the fuel tank. Vapor storage or consuming devices are connected to the other end of the conduit. An electrically operated valve is mounted in the conduit to control fluid flow through the conduit. Communicating with the tank interior is a pressure sensing device that controls a switch electrically in series with the electrically operated valve. A liquid fuel sensing device is located within the tank and controls a switch connected electrically in series with the electrically operated valve and the switch controlled by the pressure sensing device.

The switches are connected to permit opening of the solenoid valve only when fuel tank pressure exceeds a predetermined amount and the conduit opening is clear of liquid fuel. Associated with the devices is a fuel tank attitude mechanism for preventing fluid flow through the conduit in the event that the fuel tank acquires an attitude exceeding a predetermined variation from normal tank attitude. The predetermined variation typically is at least 90 degrees and thus corresponds to a situation in which the vehicle is lying on its side or is completely upside down.

In a preferred arrangement, the conduit opens into the tank a short distance below the tank roof to provide a vapor space adjacent the tank roof, and the liquid fuel sensing device includes a buoyant member mounted movably in the opening of the conduit. The buoyant member moves from a rest position to a buoyed position when liquid fuel is present at the conduit opening. A magnet is embedded in the buoyant member and the switch controlled by the liquid fuel sensing device is a magnetically actuated and totally encapsulated reed switch located where the magnetic field of the magnet will actuate the switch when the buoyant member is in its buoyed position. The attitude sensing device then includes a weight mounted to bear on the buoyant member only when tank attitude exceeds the predetermined variation to move the buoyant member to its buoyed position regardless of the presence or absence of liquid fuel at the conduit opening.

An alternate arrangement utilizes a mercury switch as the attitude sensing device. The mercury switch is connected electrically in series with the electrically operated valve and the other switches and is arranged to prevent the valve from opening the conduit whenever tank attitude exceeds the predetermined variation.

BRIEF DESCRIPTION OF THE DRAWINGS

FIGS. 1 and 2 are side and end views of a typical vehicle fuel tank showing the relationship to the tank of an integrated mechanism containing the devices utilized in the system of this invention. FIG. 6 is a schematic diagram of the electrical circuitry involved in the system.

DETAILED DESCRIPTION

Figure 3:
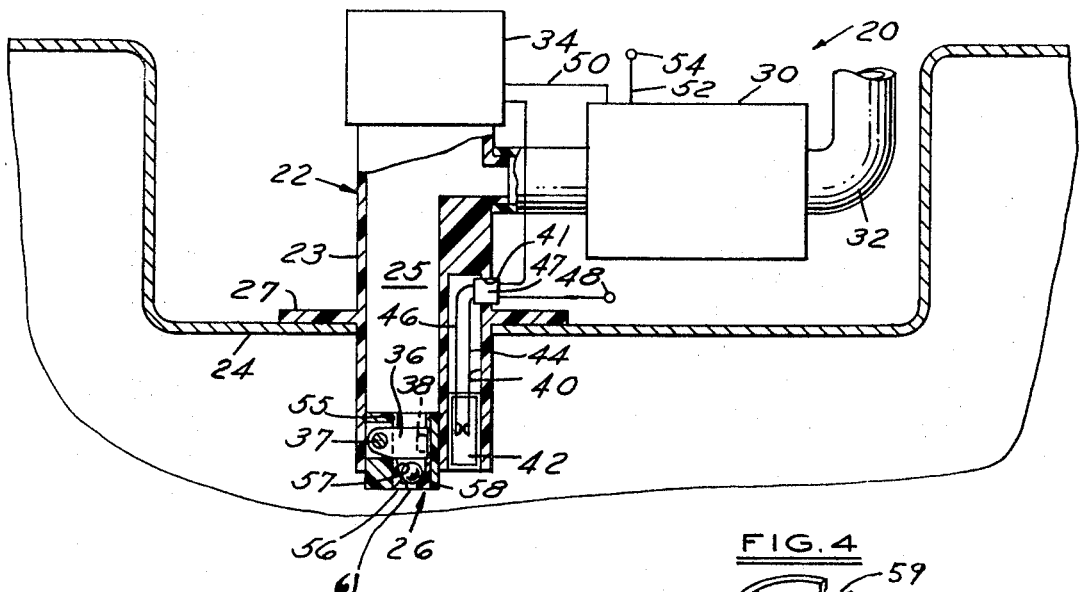
FIG. 3 is a partially sectioned elevation of the integrated mechanism in which a magnetically actuated reed switch and a buoyant magnetic member are used for level sensing and a ball weight that bears on the buoyant member is used for attitude sensing.

Referring to FIGS. 1 and 2, an automotive fuel tank typically is made in two sections 10 and 12 that are joined together along a diagonal flange 14. An opening 16 is formed in one side near the top of the tank for the fuel inlet tube (not shown) and the conventional fuel line 18 leading to the engine carburetor is located in the lower portion of the tank. A plurality of spaced depressions 20 are formed in the surfaces of the tank to impart greater rigidity thereto and an integrated valve mechanism 22 capable of serving as the system of this invention is mounted in the middle of the upper surface of the tank in one of the depressions.

Turning to FIG. 3, mechanism 22 comprises a conduit 23 that extends through the tank roof 24 and terminates a short distance below the roof. A flange 27 formed on the conduit exterior bears against the tank roof to position the mechanism in place. Conduit 23 contains a passage 25 offset to one side of the conduit centerline that opens into the tank interior at opening 26. The conduit preferably is made of a plastic material compatible with the fuel such as a polyamide or polypropylene. Passage 25 extends upward from opening 26 for a short distance and then makes a right-angle turn to a solenoid valve 30. The other side of solenoid valve 30 is connected to a tube 32 that leads to vapor storage or vapor consuming devices (not shown).

A pressure sensitive device 34 is mounted on top of conduit 23 in communication with passage 25. Pressure sensitive device 34 typically contains a flexible diaphragm movable in response to the pressure in passage 25 and a set of switch contacts that are opened or closed by movement of the diaphragm. A buoyant member 36 is mounted pivotally by pin 37 to the thinner wall of conduit 23 near opening 26. Member 36 typically is made of a foamed polymeric material compatible with the fuel and has a small magnet 38 embedded in the end opposite the pivot point.

An elongated hole 40 is formed in the thicker wall of conduit 23 adjacent magnet 38. The hole is parallel to the axis of passage 25 and extends above flange 27 where it connects with a lateral hole 41 formed in the conduit wall. Mounted sealingly in hole 40 is a magnetically sensitive and totally encapsulated reed switch 42. Reed switch 42 contains a pair of contacts, one of which is movable onto the other contact when under the influence of a magnetic field. Electrical leads 44 and 46 connected to the contacts extend upward through the remainder of hole 40 and pass through a grommet 47 mounted in lateral hole 41. Outside of grommet 47, lead 44 connects with a terminal 48 and lead 46 connects with one of the switch contacts associated with pressure sensitive device 34. Another lead 50 connects the other switch contact of device 34 with the solenoid winding of valve 30 and a lead 52 connects the solenoid winding to a terminal 54.

Figure 4:
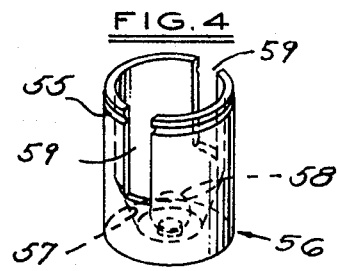
FIG. 4 is a detail view of a holder for the ball weight that fits into the open end of the conduit.

Opening 26 has a U-shaped member 56 (see also FIG. 4) mounted therein with the legs of the U projecting upward along opposite sides of buoyant member 36 (one of the legs has been removed from FIG. 3 for clarity). Member 56 is stationary with respect to conduit 23 and is held in place by small projections on the inner wall of conduit 23 that snap into a groove 55 in the upper portion of member 56. Buoyant member 36 moves independently of member 56 in the slots 59 thereof.

The inner walls of the lower portion of member 56 slope inwardly as at 57 and a sphere shaped weight 58 is located between the sloping surfaces where gravity normally holds the weight against the base of the U. An opening 61 in the base of member 56 communicates at all times with passage 25 regardless of the position of the weight. If a change occurs in tank attitude sufficient to shift the force of gravity to the point where gravity urges the weight along one of the sloped surfaces, the weight rolls into contact with buoyant member 36, which moves the buoyant member into a raised position regardless of any buoyant forces acting thereon. Slopes of about 10° or greater typically are sufficient to produce such movement for tank attitudes varying from normal by 90° or more.

Terminals 48 and 54 are connected to opposite sides of a vehicle battery 59 as shown in FIG. 6. Referring to FIG. 6, reed switch 42 and the switch associated with pressure sensing device 34 are connected in series with the winding of solenoid valve 30. In a typical installation, solenoid valve 30 is normally closed to block communication between conduit 23 and tube 32. The switch associated with pressure sensing device 34 is normally open but closes when pressure in the fuel tank exceeds some predetermined value, typically about 0.5 p.s.i.

When opening 26 is clear of liquid fuel, buoyant member 36 pivots into a lowered or rest position where the magnetic field provided by the magnet 38 is applied to reed switch 42 to close the contacts of the reed switch. If tank pressure exceeds the predetermined value, the solenoid valve is actuated to connect conduit 23 to tube 32, which vents fuel vapors through tube 32 to the storage or consuming devices. If tank pressure falls below the predetermined value (indicating that the fuel tank does not require vapor removal), or if liquid fuel at opening 26 raises buoyant member 36 to open the contacts of the reed switch (in which case liquid fuel could enter tube 32), the solenoid winding is deactivated and the solenoid valve remains closed. If tank attitude varies from normal by an amount sufficient for weight 58 to move buoyant member 36 into the position where the magnetic field of magnet 38 is removed from the reed switch, the contacts of the reed switch open and valve 30 remains closed to prevent the escape of fluid regardless of the presence or absence of liquid fuel.

Figure 5:
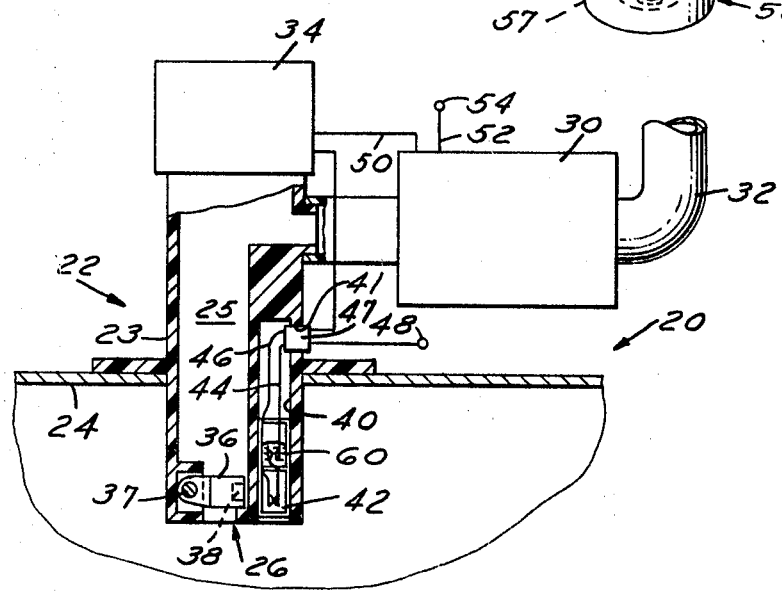
FIG. 5 is a partially sectioned elevation similar to FIG. 3, but in which a mercury switch is used for attitude sensing.

Turning to the alternate embodiment shown in FIG. 5, conduit 22 and its associated components are constructed in accordance with the embodiment shown in FIG. 3 except that U-shaped member 56 and weight 58 are not included in opening 26. A mercury switch having its contacts in the lower portion of the switch is installed in the upper portion of hole 40 and reed switch 42 is installed in hole 40 below the mercury switch. Mercury switch 60 contains a globule of mercury that produces electrical contact between the contacts of the mercury switch whenever the tank attitude is in a normal position. Lead 44 connects terminal 48 to one of the contacts in the mercury switch and the other contact of the mercury switch is connected to one of the contacts of reed switch 42. The other contact of reed switch 42 is connected by lead 46 to one of the contacts associated with pressure switch 34.

Reed switch 42 is actuated magnetically by the magnetic field of magnet 38 and pressure sensitive switch 34 responds to fuel tank pressure in the manner described with respect of FIG. 3. Mercury switch 60 is electrically in series with reed switch 42 and the switch contacts associated with pressure sensitive device 34. If the vehicle attitude varies from normal attitude by the predetermined amount, the globule of mercury in the mercury switch moves to one side or the upper end of the mercury switch, thereby breaking the electrical contact in the mercury switch. Solenoid valve 30 thus cannot be opened and the system thereby prevents liquid fuel from reaching conduit 32 whenever the vehicle assumes the abnormal attitude.

Each of the illustrated embodiments prevents liquid fuel from reaching conduit 32 in the event of any electrical failure and thus each is a fail-safe system.

Thus this invention provides a system for removing fuel vapors from a vehicle tank that prevents contamination of vapor consuming or storing equipment with liquid fuel and also prevents the escape of liquid fuel in the event of an unusual vehicle attitude resulting from an accident.

I claim:

1. A system for removing fuel vapors from a fuel tank movable into varying attitudes while preventing removal of liquid fuel regardless of tank attitude including an inverted attitude comprising:
   a source of electrical energy,
   a conduit extending into said fuel tank,
   electrically operated valve means coupled to said source of electrical energy for controlling fluid flow through said conduit,
   pressure sensing means communicating with the interior of said fuel tank, said pressure sensing means controlling a switch electrically in series with said electrically operated valve means,
   liquid fuel sensing means located in said tank for controlling a switch electrically in series with said valve means and the switch controlled by the pressure sensing means, said pressure sensing means and liquid fuel sensing means permitting opening of the valve means only when fuel tank pressure exceeds a predetermined amount and the conduit opening is clear of liquid fuel, and
   fuel tank attitude means for preventing fluid flow through said conduit when the fuel tank acquires an attitude exceeding a predetermined variation from normal tank attitude.

2. The system of claim 1 in which the liquid fuel sensing means includes a buoyant means mounted movably in the opening of the conduit, said buoyant means moving from a rest position to a buoyed position when liquid fuel is present at the conduit opening, and the attitude means includes a weight mounted to bear on said buoyant means only when tank attitude exceeds the predetermined variation, said weight then moving the buoyant means to its buoyed position.

3. The system of claim 2 in which the liquid fuel sensing means comprises a magnetic means embedded in said buoyant means and the switch controlled by said liquid level sensing means is a magnetically actuated reed switch located where the magnetic field of said magnetic means actuates said switch when the buoyant means is in its rest position.

4. The system of claim 1 in which the attitude means comprises a mercury switch electrically in series with said electrically operated valve means, said mercury switch preventing opening of the valve means when fuel tank attitude exceeds said predetermined variation from normal tank attitude.

5. The system of claim 4 in which said electrically operated valve means is normally closed and said mercury switch is also in series with the switches controlled by said pressure sensing means and said liquid fuel sensing means.